US007040655B2

(12) United States Patent
Igawa et al.

(10) Patent No.: US 7,040,655 B2
(45) Date of Patent: May 9, 2006

(54) AIRBAG APPARATUS

(75) Inventors: Tadahiro Igawa, Hikone (JP); Weixin Gu, Shiga (JP)

(73) Assignee: Takata Corporation, Tokyo (JP)

(*) Notice: Subject to any disclaimer, the term of this patent is extended or adjusted under 35 U.S.C. 154(b) by 255 days.

(21) Appl. No.: 10/679,868

(22) Filed: Oct. 7, 2003

(65) Prior Publication Data

US 2004/0135352 A1 Jul. 15, 2004

(30) Foreign Application Priority Data

Oct. 28, 2002 (JP) ............................ 2002-312955

(51) Int. Cl.
*B60R 21/30* (2006.01)

(52) U.S. Cl. ...................................... 280/739; 280/729

(58) Field of Classification Search ................ 280/739, 280/729, 728.3, 731
See application file for complete search history.

(56) References Cited

U.S. PATENT DOCUMENTS

| | | | | |
|---|---|---|---|---|
| 5,234,229 | A | 8/1993 | Gordon | |
| 5,257,818 | A | 11/1993 | Steffens, Jr. | |
| 5,437,473 | A | 8/1995 | Henseler | |
| 5,603,526 | A * | 2/1997 | Buchanan | 280/739 |
| 5,645,297 | A | 7/1997 | Rose et al. | |
| 5,669,628 | A | 9/1997 | Kaufmann et al. | |
| 5,683,102 | A | 11/1997 | Davis et al. | |
| 5,704,639 | A * | 1/1998 | Cundill et al. | 280/739 |
| 5,743,558 | A | 4/1998 | Seymour | |
| 5,927,748 | A | 7/1999 | O'Driscoll | |
| 6,047,986 | A | 4/2000 | Ishikawa et al. | |
| 6,059,312 | A * | 5/2000 | Staub et al. | 280/729 |
| 6,086,092 | A * | 7/2000 | Hill | 280/729 |
| 6,131,942 | A | 10/2000 | Fujii et al. | |
| 6,158,770 | A | 12/2000 | Ryan et al. | |
| 6,224,101 | B1 * | 5/2001 | Nishijima et al. | 280/743.2 |
| 6,290,257 | B1 * | 9/2001 | Bunce et al. | 280/739 |
| 6,471,239 | B1 * | 10/2002 | Nishijima et al. | 280/729 |
| 6,692,021 | B1 * | 2/2004 | Amamori | 280/739 |
| 2004/0232677 | A1 * | 11/2004 | Fischer et al. | 280/739 |

FOREIGN PATENT DOCUMENTS

| | | |
|---|---|---|
| DE | 199 33 836 A1 | 2/2000 |
| DE | 298 20 479 U1 | 3/2000 |
| EP | 0 638 466 A1 | 2/1995 |
| GB | 2 315 467 A | 2/1998 |
| GB | 2 348 177 A | 9/2000 |
| JP | 2-115747 A | 4/1990 |
| JP | 6-127329 A | 5/1994 |
| JP | 6-171453 A | 6/1994 |
| JP | 6-305391 A | 11/1994 |

(Continued)

*Primary Examiner*—David R. Dunn
*Assistant Examiner*—Drew Brown
(74) *Attorney, Agent, or Firm*—Foley & Lardner LLP

(57) ABSTRACT

An airbag apparatus including a vent hole that is reliably opened when the pressure of an airbag has reached a predetermined level. An apparatus includes inner and outer bags placed in a retainer in folded conditions and the retainer is closed by a module cover. The retainer has a vent hole. The vent hole is closed by a lid or sheet type closing structure. The module cover is pushed open by the inflation pressure of the inner bag. The gas in the inner bag is discharged into the outer bag to inflate the outer bag. When the inner pressure of the outer bag has reached a predetermined level, the closing structure opens to open the vent hole.

6 Claims, 12 Drawing Sheets

FOREIGN PATENT DOCUMENTS

| | | | |
|---|---|---|---|
| JP | 7-329697 | A | 12/1995 |
| JP | 9-323604 | A | 12/1997 |
| JP | 10-29487 | A | 2/1998 |
| JP | 10-35405 | A | 2/1998 |
| JP | 10-76896 | A | 3/1998 |
| JP | 10-076907 | | 3/1998 |
| JP | 11-268605 | A | 10/1999 |
| JP | 11-334519 | A | 12/1999 |
| JP | 11-334520 | A | 12/1999 |
| JP | 11-334521 | A | 12/1999 |
| JP | 11-334522 | A | 12/1999 |
| JP | 11-334523 | A | 12/1999 |
| JP | 11-334524 | A | 12/1999 |
| JP | 11-334525 | A | 12/1999 |
| JP | 2000-255372 | A | 9/2000 |
| JP | 2000-280855 | A | 10/2000 |

* cited by examiner

AIRBAG APPARATUS

BACKGROUND

The present invention relates to an airbag apparatus for a vehicle for protecting an occupant of the vehicle in the case of a collision.

Typical airbag apparatuses have a retainer to which an airbag is connected, an inflator for generating gas for inflating the airbag, and a cover for covering the airbag. The inflator generates gas to inflate the airbag in a car crash. The airbag opens the cover to inflate into the interior of a vehicle.

Certain airbag apparatuses include a vent hole. When an occupant hits against an inflated airbag, gas in the airbag flows out through the vent hole to absorb impact applied to the occupant.

In general, the vent hole is kept closed until the inner pressure of the airbag increases to a predetermined level in order to prevent the gas from flowing out early through the vent hole. U.S. Pat. Nos. 6,158,770 and 5,743,558 (both incorporated by reference herein) disclose a vent hole having a valve for closing the vent hole. The valve is opened by a drive unit. The drive unit, however, increases the weight of an airbag apparatus and also increases the cost.

SUMMARY OF THE INVENTION

The present invention provides an airbag apparatus having a vent hole that reliably opens when the inner pressure of the airbag has reached a predetermined level.

An airbag apparatus according to the present invention has an airbag including an inner bag and an outer bag, wherein gas from a gas generating means is supplied into the inner bag to inflate the inner bag; the gas is discharged through an opening of the inner bag into the outer bag to inflate the outer bag; and the gas in the outer bag is discharged through a vent hole. The vent hole is provided to a retainer to which at least one of the inner bag and the outer bag is connected; and the vent hole has a mechanism for closing the vent hole until the inner pressure of the outer bag reaches a predetermined level.

With the airbag apparatus according to the invention, when the gas generating means is activated, gas is let in the inner bag to inflate the inner bag. The gas in the inner bag then flows into the outer bag to inflate the outer bag. When an occupant contacts the outer bag the inner pressure thereof has exceeded a predetermined level, the vent-hole closing mechanism opens and gas is discharged through the vent hole.

According to an embodiment of the present invention, while the inner bag inflates, the pressure in the outer bag is much lower than that of the inner bag, so that the closing mechanism does not open. Also, the closing mechanism does not open until gas flows out from the inner bag into the outer bag and thus the gas pressure in the outer bag reaches a predetermined level.

Accordingly, with a structure in which a folded airbag is covered with a cover and the cover is pushed open by the inflation pressure of the inner bag, little gas is supplied into the outer bag until the cover opens. As a result, the pressure in the outer bag is kept extremely low and the vent-hole closing mechanism is kept closed. When the cover is pushed open, the outer bag inflates sufficiently with the gas from the inner bag. Even when the outer bag inflates sufficiently, the closing mechanism is kept closed until the occupant contacts the outer bag.

When the occupant has contacted the airbag to increase the inner pressure of the outer bag to a predetermined level or more, the closing mechanism opens and the gas flows out through the vent hole.

The inflated airbag can receive the occupant securely. The outer bag holds a sufficient amount of gas therein and so when the occupant contacts the outer bag at a high speed, the gas flows out from the outer bag to absorb the impact.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
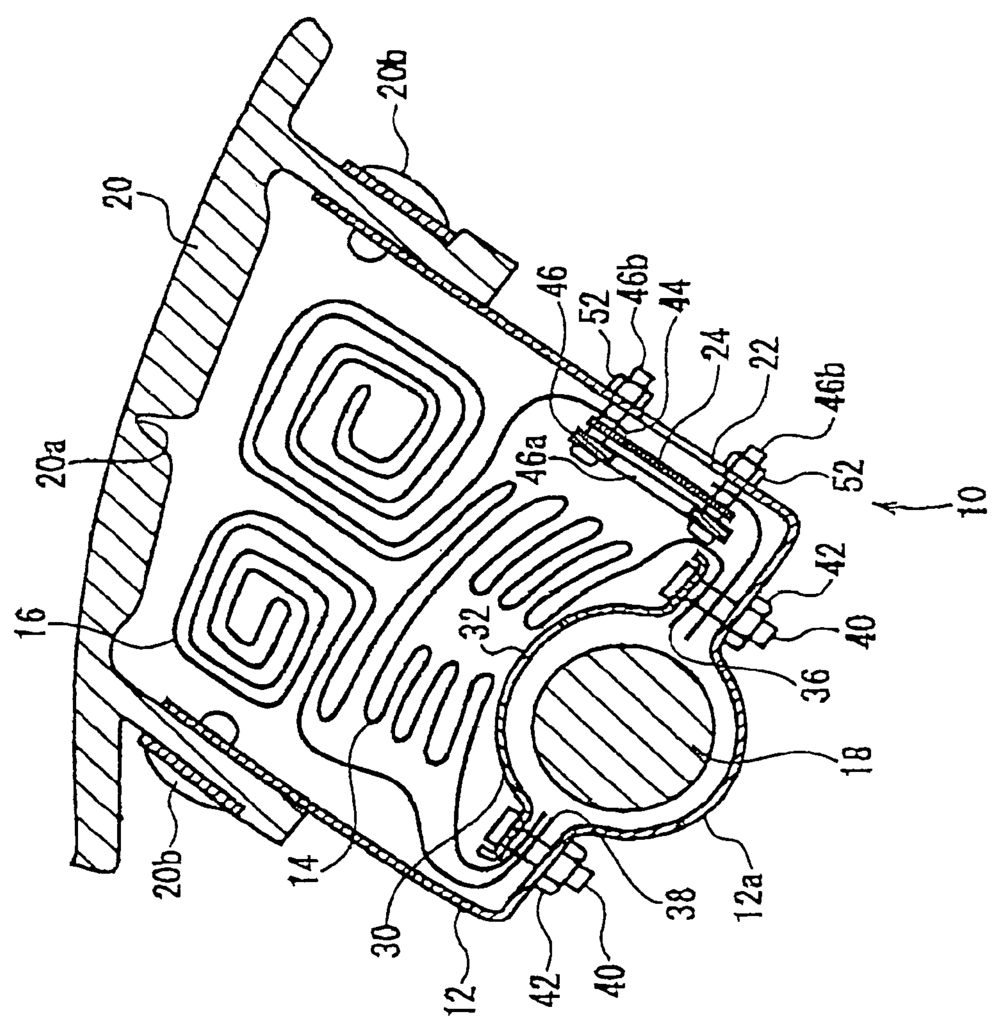
FIG. 1 is a sectional view of a passenger-side airbag apparatus according to an embodiment of the present invention.
Figure 2:
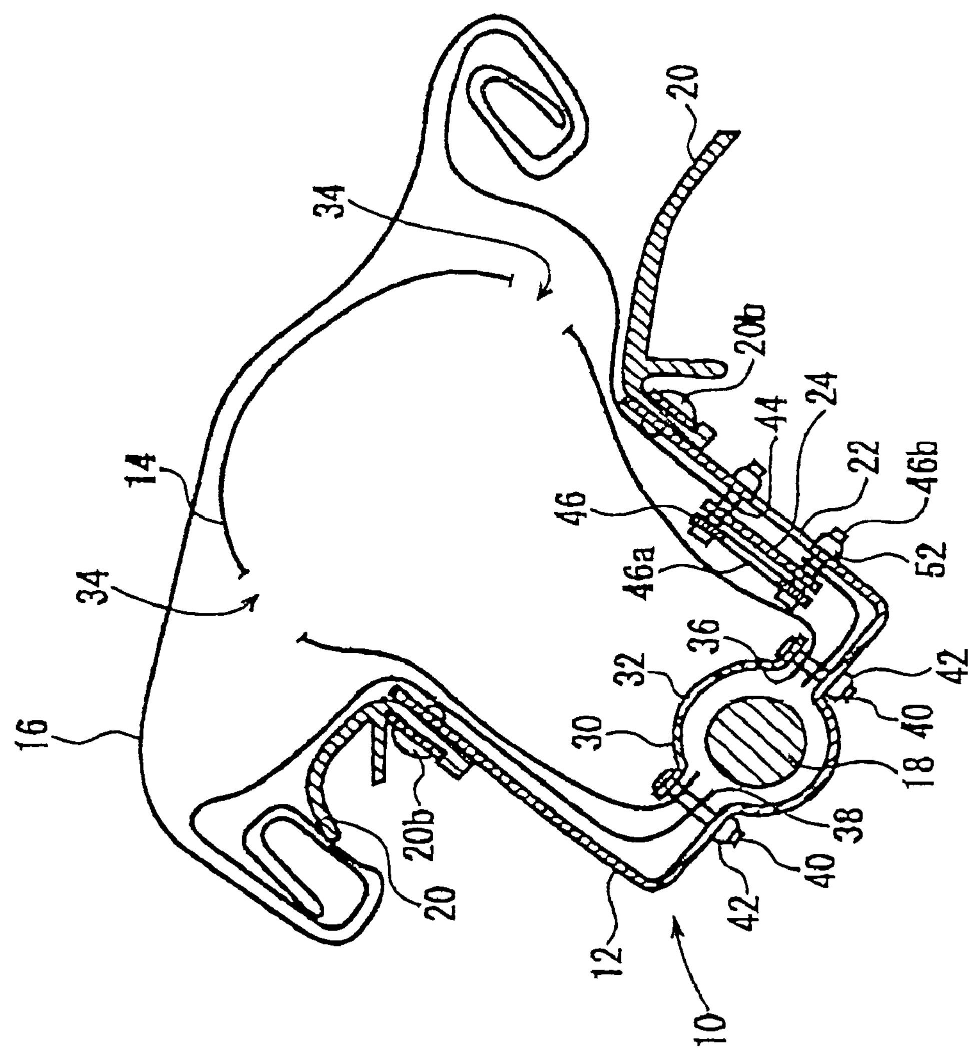
FIG. 2 is a sectional view of the airbag apparatus immediately after a module cover has started to open.
Figure 3:
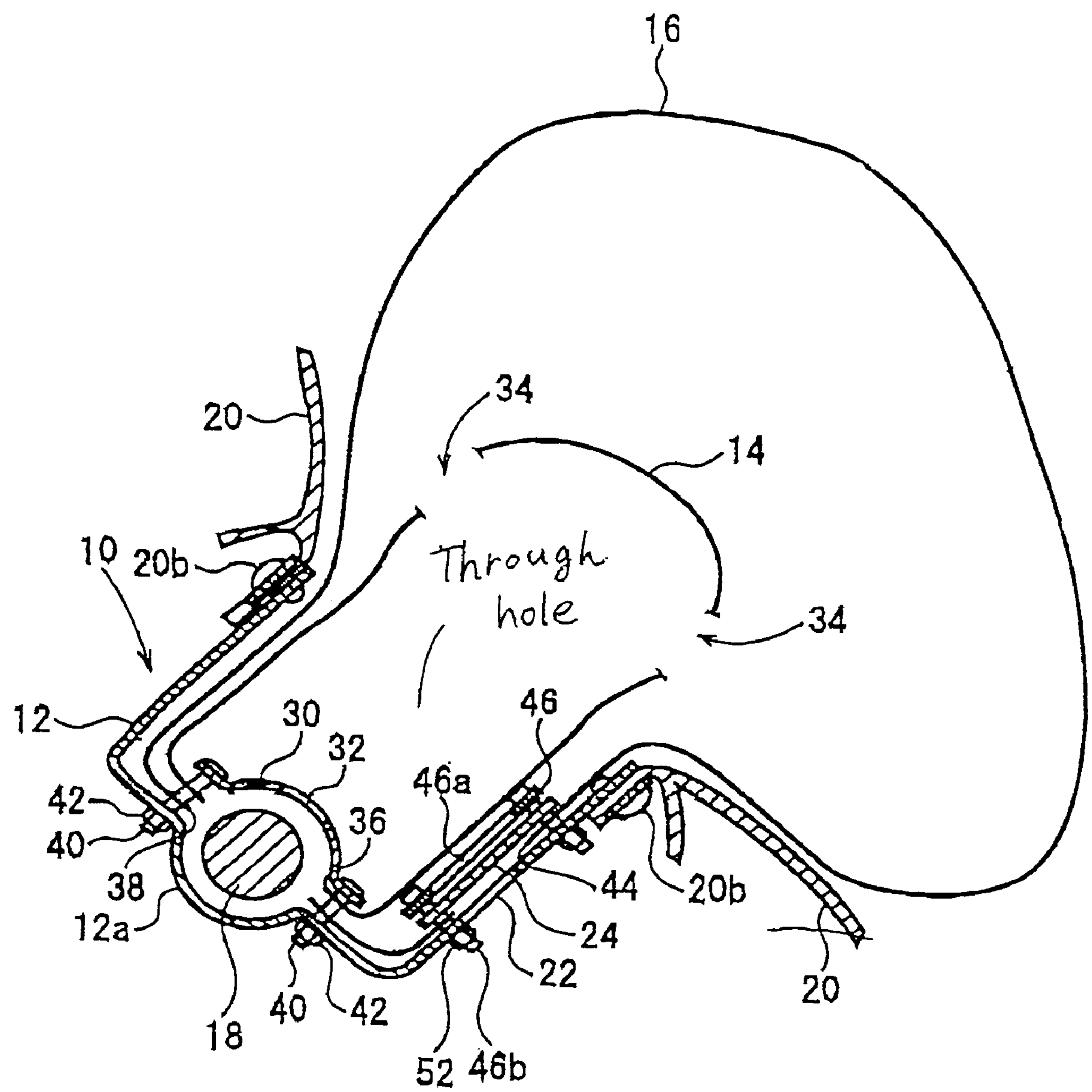
FIG. 3 is a sectional view of the airbag apparatus when an outer bag has fully inflated.
Figure 4:
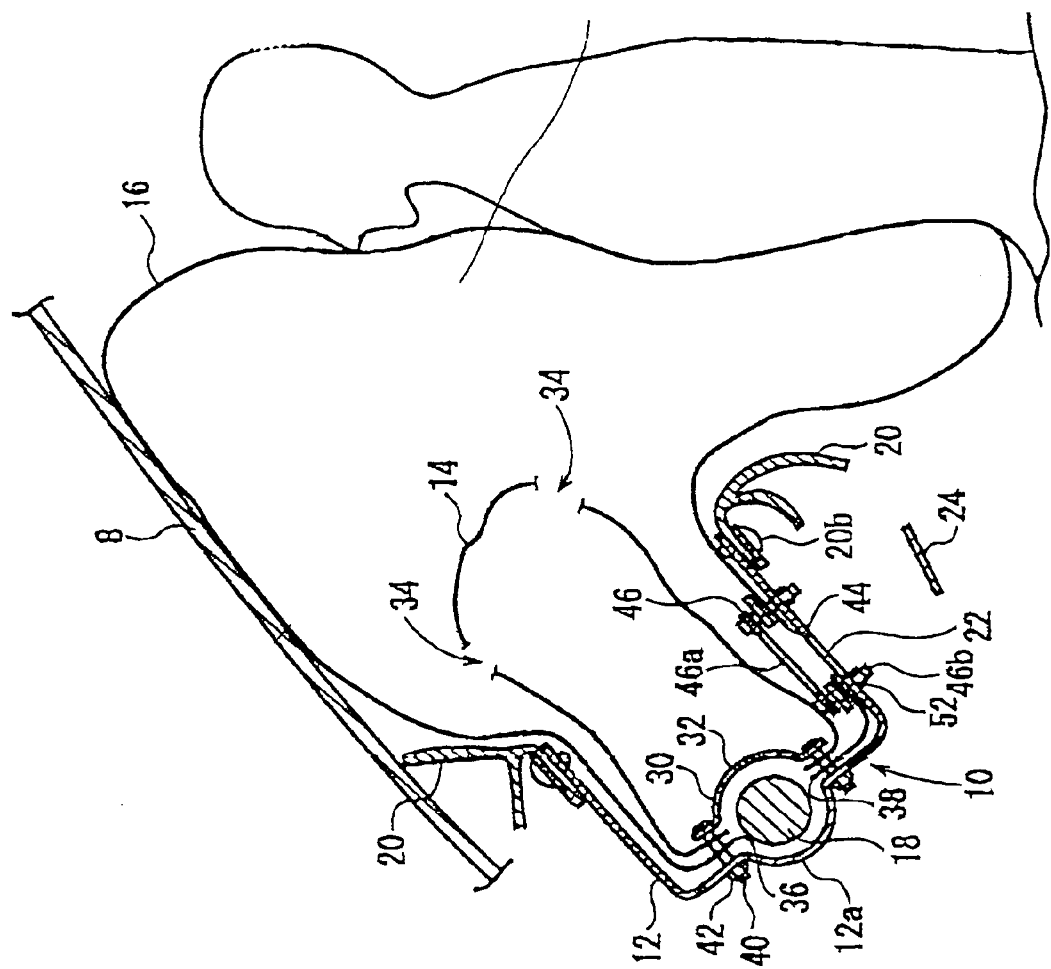
FIG. 4 is a sectional view of the airbag apparatus after an occupant has hit against the outer bag.
Figure 5:
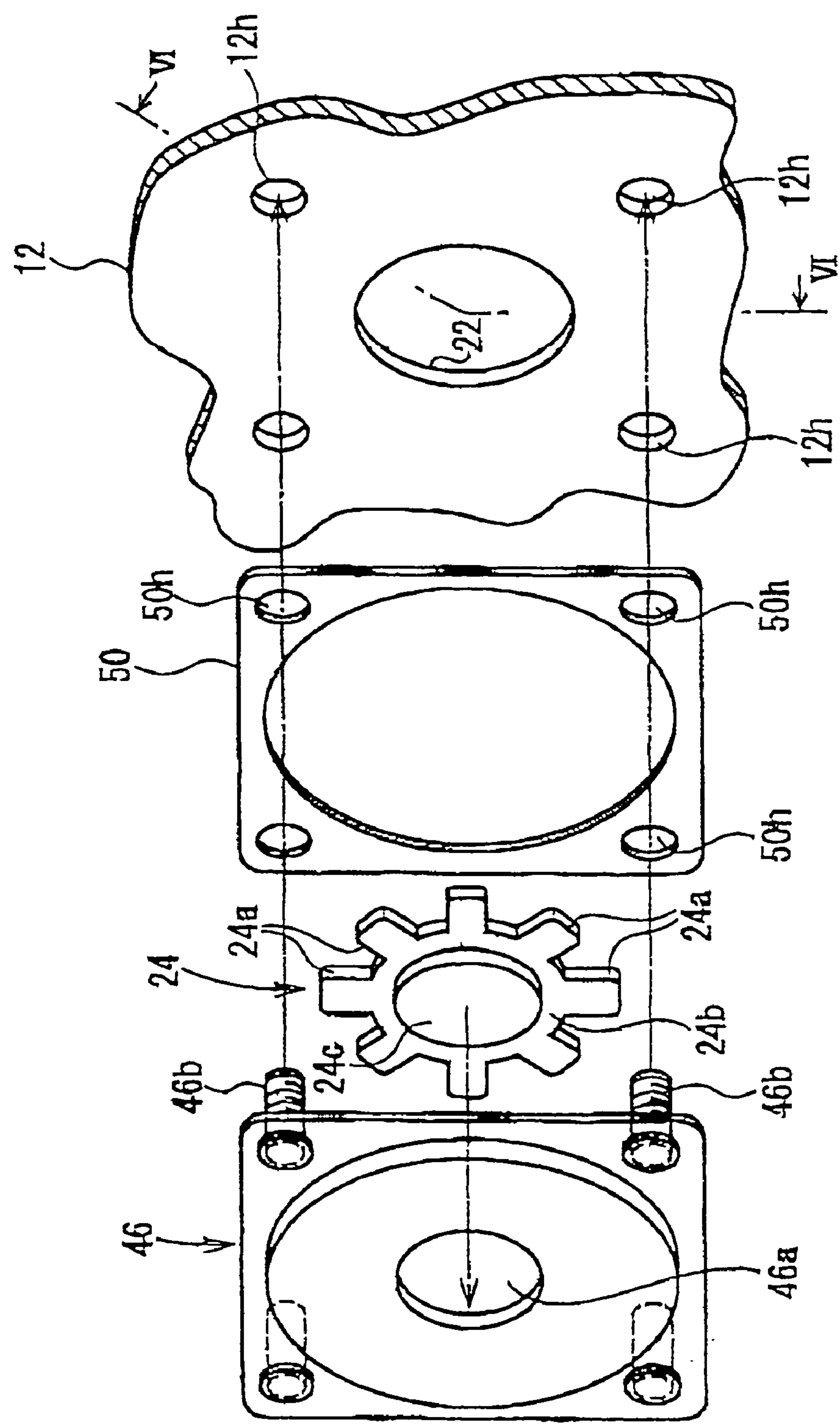
FIG. 5 is an exploded perspective view of a vent-hole closing mechanism according to an embodiment of the present invention.
Figure 6A:
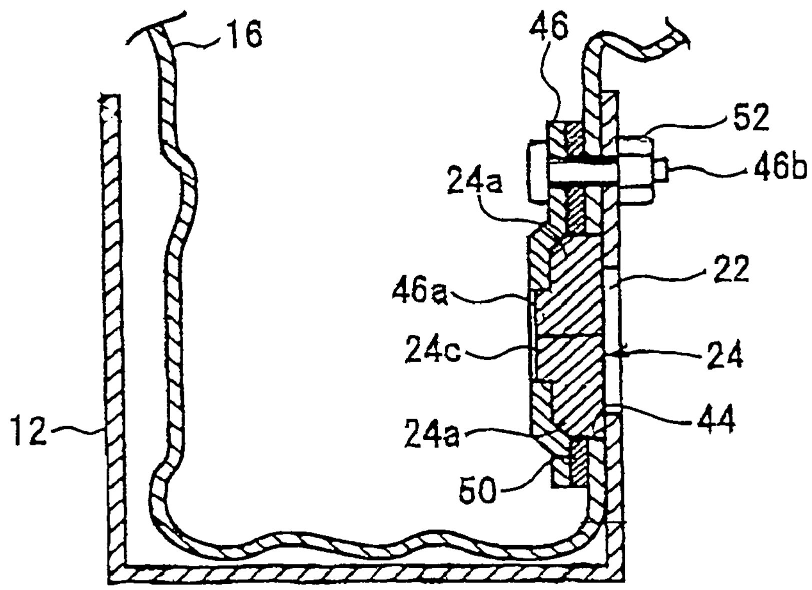
FIG. 6 is a sectional view of an essential part of the vent-hole closing mechanism.
Figure 6B:
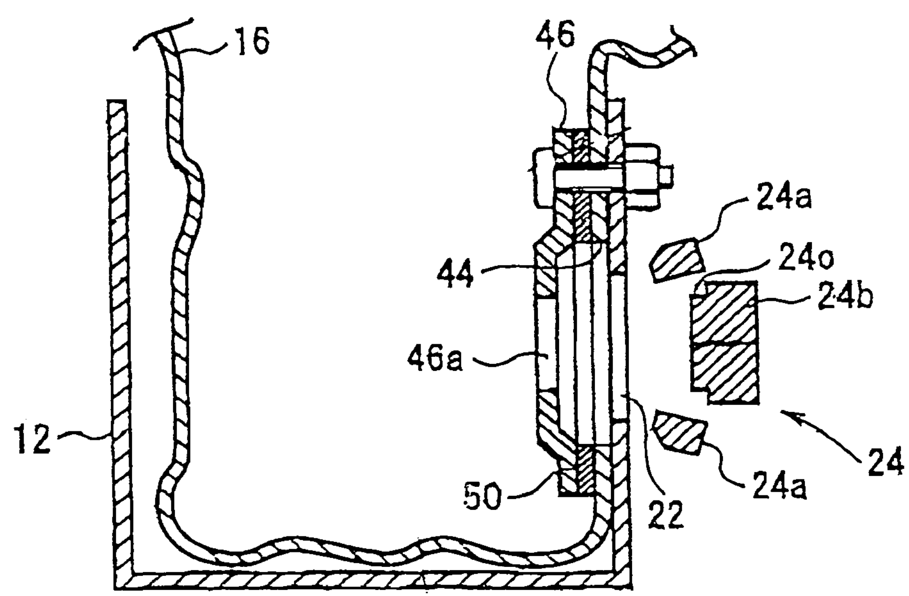
Figure 7:
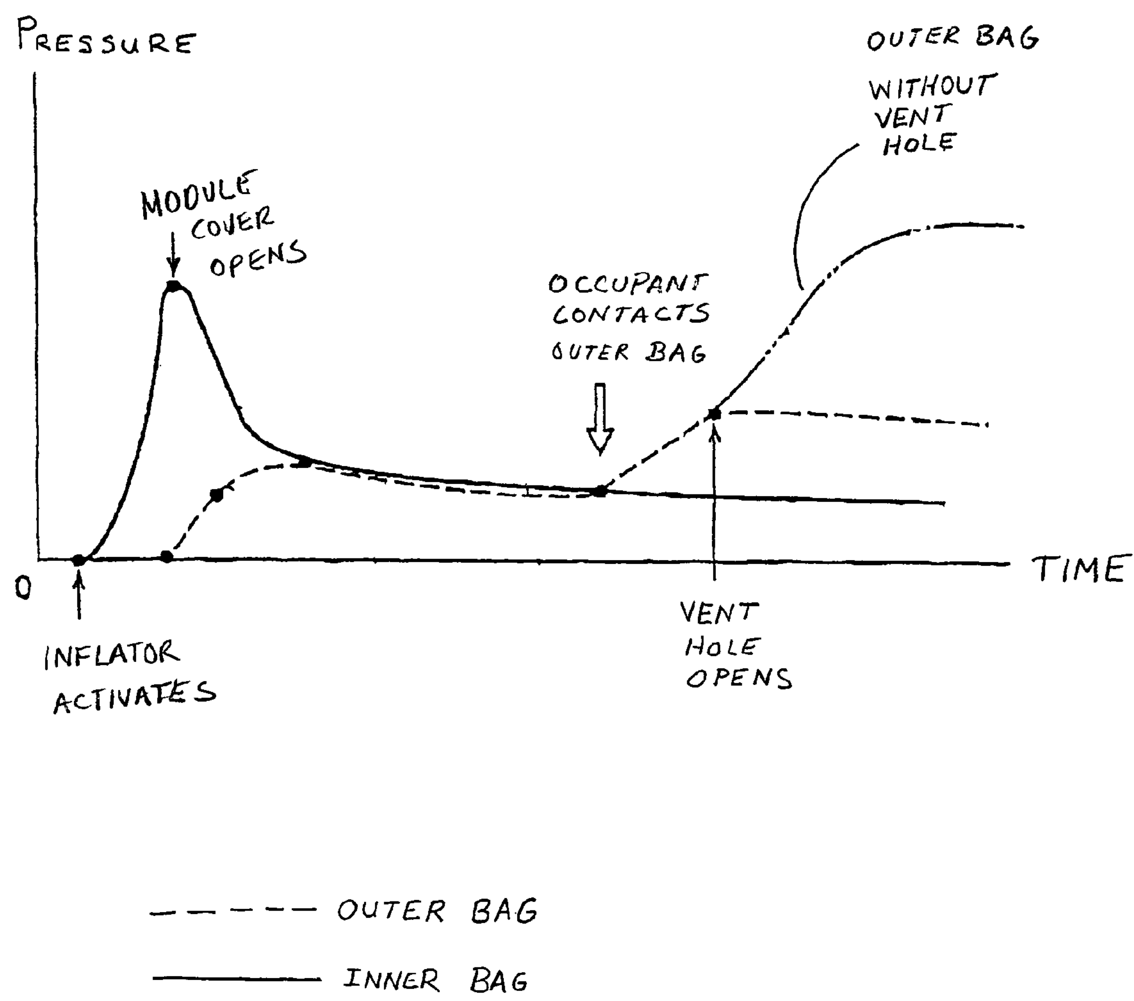
FIG. 7 is an operational characteristic diagram of the airbag apparatus of FIG. 1.

Embodiments of the present invention will be described hereinafter with reference to the drawings. FIG. 1 is a sectional view of a passenger-side airbag apparatus according to an embodiment of the present invention; FIG. 2 is a sectional view of the airbag apparatus immediately after a module cover has started to open; FIG. 3 is a sectional view of the airbag apparatus when an outer bag has fully inflated; FIG. 4 is a sectional view of the airbag apparatus after an occupant has hit against the airbag; FIG. 5 is an exploded perspective view of a vent-hole closing means; FIG. 6(*a*) is a sectional view of an essential part of the vent-hole closing means, showing the structure thereof; FIG. 6(*b*) is a sectional view of an essential part of the vent-hole closing means when it opens; and FIG. 7 is an operational characteristic diagram of the airbag apparatus.

The airbag apparatus 10 may be a passenger-side airbag apparatus mounted on the top of an instrument panel (not shown) in front of a front passenger seat of a vehicle. Numeral 8 in FIG. 4 denotes a windshield of a car.

As shown in FIG. 1, the airbag apparatus 10 includes a retainer 12 of which the front side is open, an airbag formed of an inner bag 14 and an outer bag 16 arranged in the retainer 12 in a folded condition, a substantially column-like inflator 18 serving as a gas generating means for inflating the airbag, a module cover 20 for covering the front opening of the retainer 12, a vent hole 22 provided to the retainer 12, and a lid 24 serving as a closing mechanism for closing the vent hole 22. The module cover 20 is mounted to the retainer 12 with a mounting member 20*b*. A tear line 20*a* is provided on the back of the module cover 20.

The retainer 12 is open on the top thereof in FIG. 1 and has a recess 12*a* on the bottom, which expands outward in a semicircular shape. The lower half of the inflator 18 is arranged in the recess 12*a* and fixed on the bottom of the retainer 12 with a holding member 30 covering from above. The entire holding member 30 is also semicircular along the outer periphery of the inflator 18. The holding member 30 has an opening 32 for passing gas through.

The inner bag 14 has a capacity from about 1.5 times as high as that of the retainer 12 to about half of that of the outer bag 16. The outer bag 16 has a capacity equal to that of a general passenger-side airbag. The inner bag 14 is arranged in the outer bag 16. The end of the inner bag 14 has one or more gas-through openings 34 for communicating the inside of the inner bag 14 with the inside of the outer bag 16.

The inner bag 14 and the outer bag 16 have openings 36 and 38, respectively, as shown in FIG. 1. The rims of the openings 36 and 38 are sandwiched and fixed between the holding member 30 and the bottom of the retainer 12. The holding member 30 and the openings 36 and 38 are each fixed to the retainer 12 with a bolt 40 and a nut 42.

The vent hole 22 is provided at the lower part of the side of the inner bag 14. In this embodiment, the outer bag 16 has an opening 44 in the position overlapping with the vent hole 22. The lid 24 is placed on the opening 44 from the inside of the outer bag 16, the rims of the lid 24 and the opening 44 being fixed to the rim of the vent hole 22 of the retainer 12 with a holding member 46. The lid 24 includes a substantially disk-shaped body 24*b* and a plurality of projections 24*a* project radially from the periphery thereof. A thick plate 24*c* is placed on the center of the body 24*b*. The diameter of the disk-shaped body 24*b* is smaller than that of the vent hole 22.

As shown in FIG. 5, a packing or gasket 50 may be positioned between the outer bag 16 (not shown in FIG. 5) and the inner surface of the retainer 12. The holding member 46 is shaped like a rectangular plate having a through hole 46*a* in the center. The thick plate 24*c* of the lid 24 is fitted in the through hole 46*a*.

Stud bolts 46*b* project from the four corners of the holding member 46. The packing 50, the retainer 12, and the rim of the opening 44 of the outer bag 16 have small holes 50*h* and 12*h* (small holds of the outer bag 16 are not shown) for passing the stud bolts 46*b* through, respectively. The stud bolts 46*b* are inserted in the small holes with the lid 24 interposed between the holding member 46 and the outer bag 16, and nuts 52 are tightened to the stud bolts 46*b*, thereby retaining the lid 24 to the retainer 12. The projections 24*a* of the lid 24 are sandwiched between the holding member 46 and the retainer 12.

As shown in FIG. 1, the inner bag 14 may be placed in a relatively inner part of the retainer 12 in a folded condition. How the inner bag 14 and the outer bag 16 are folded is not limited to that in the drawing.

The operation of the exemplary airbag apparatus 10 will now be described.

When the inflator 18 is activated to emit gas in a car crash, the gas from the inflator 18 enters into the inner bag 14 through the gas-through opening 32 of the holding member 30 to inflate the inner bag 14 first. As shown in FIG. 2, the inner capacity of the inner bag 14 is higher than that of the retainer 12. As a result, when the inner bag 14 inflates, the module cover 20 is torn open along the tear line 20*a* by the inflation pressure of the inner bag 14. The inner bag 14 pushes open the module cover 20 to inflate into the interior of the vehicle.

Only a small amount of gas flows out from the inner bag 14 into the outer bag 16 through the gas-through openings 34 until the inner bag 14 starts to inflate into the interior of the vehicle, so that the outer bag 16 remains relatively uninflated as the outer bag is pushed out from the retainer 12 by the inner bag 14.

After the inner bag 14 has sufficiently inflated, a large amount of gas in the inner bag 14 is discharged into the outer bag 16 through the gas-through openings 34, and so the outer bag 16 inflates sufficiently to protect the occupant, as shown in FIG. 3.

When the occupant contacts the outer bag 16, and so the inner pressure of the outer bag 16 has increased to exceed the predetermined level, the projections 24*a* of the lid 24 facing the through hole 46*a* of the holding member 46, shown in FIGS. 4 and 6(*b*), are not able to endure the pressure applied from the outer bag 16 to the body 24*b*. Thus, the projections 24*a* break and the body of the lid 24*b* is pushed out through the vent hole 22. Accordingly, the vent hole 22 is opened, through which the gas in the outer bag 16 is discharged to absorb the impact energy of the occupant sufficiently.

FIG. 7 is a graph showing the operational characteristics of the airbag apparatus 10. When the inflator 18 is activated, the gas from the inflator 18 is first let in the inner bag 14 to increase the inner pressure of the inner bag 14, thereby tearing open the module cover 20, as shown in FIG. 7.

When the module cover 20 is torn open and the inner bag 14 pushes open the module cover 20 to inflate, the gas in the inner bag 14 flows into the outer bag 16 through the gas-through openings 34. Thus, the outer bag 16 inflates sufficiently wide. However, even when the outer bag 16 inflates sufficiently wide, the inner pressure of the outer bag 16 does not exceed the predetermined level, so that the lid 24 does not open. Accordingly, the outer bag 16 inflates sufficiently wide to thereby receive the occupant securely.

Thereafter, when the occupant has hit against the outer bag 16, and so the inner pressure of the outer bag 16 has increased to the predetermined level, the lid 24 opens to open the vent hole 22. Therefore, the gas in the outer bag 16 flows out to absorb the impact sufficiently.

FIG. 7 shows the change in the inner pressure of the outer bag 16 after the occupant has entered the outer bag 16 in the case where the retainer 12 has not the vent hole 22, by a chain double-dashed line.

The adjustment of the cross-sectional area (the width and the thickness) and the number of the projections 24*a* of the lid 24 allows the control of the inner pressure of the outer bag 16 during the opening of the vent hole 22.

Referring to FIGS. 8 to 13, another embodiment of the invention will then be described.

Figure 8:
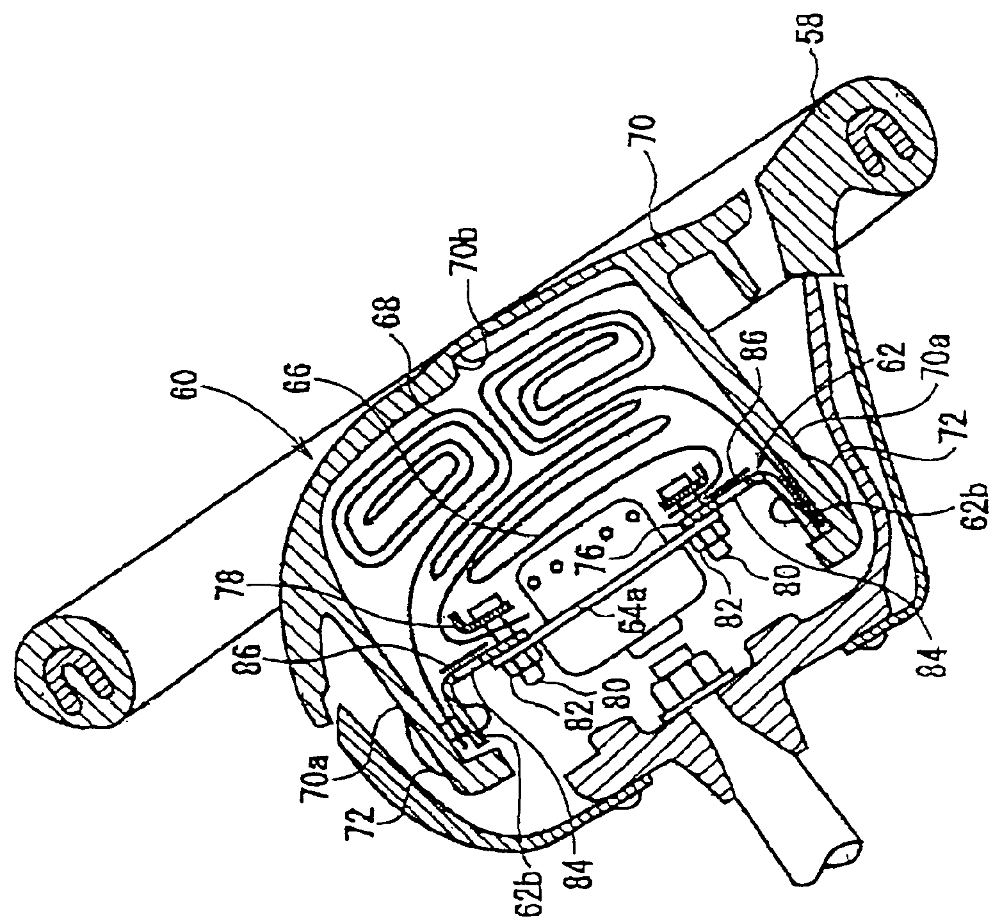
FIG. 8 is a sectional view of a driver-seat airbag apparatus according to an embodiment of the present invention.

FIG. 8 is a sectional view of a driver-seat airbag apparatus according to an embodiment of the present invention; FIG.

Figure 10:
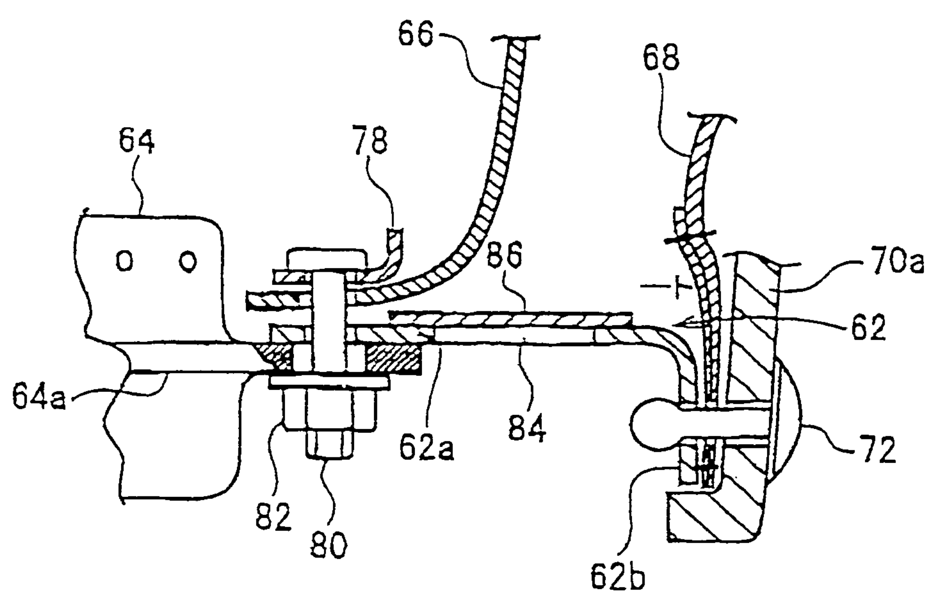
FIG. 10 is an enlarged sectional view of the vicinity of a vent hole.
Figure 11:
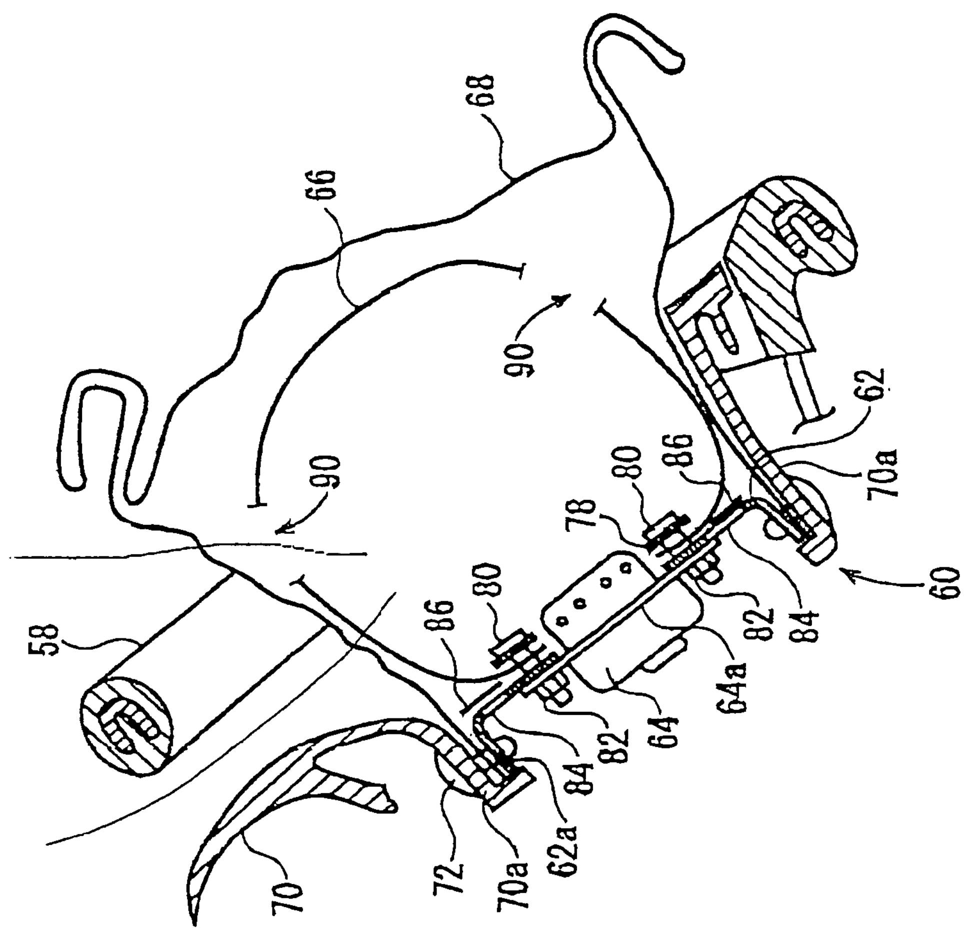
FIG. 11 is a sectional view of the airbag apparatus immediately after a module cover has started to open.
Figure 12:
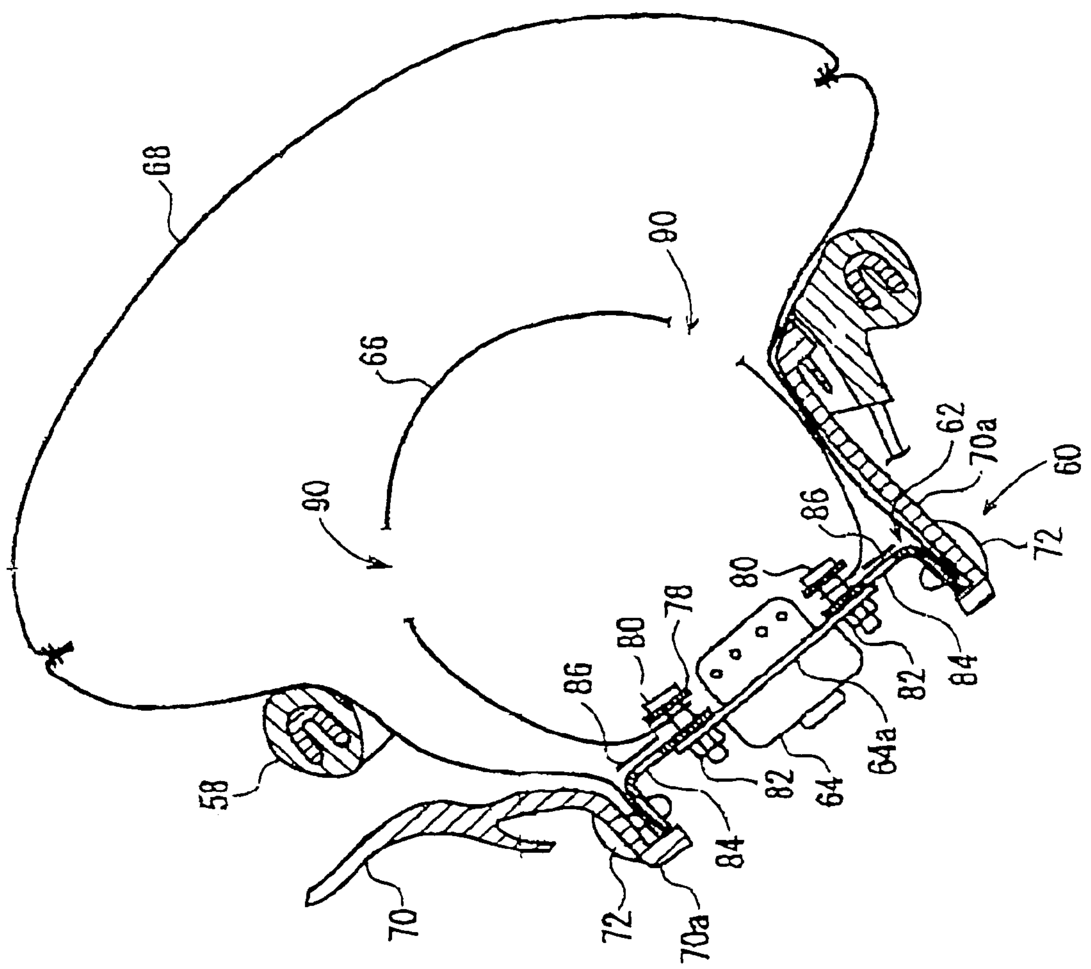
FIG. 12 is a sectional view of the airbag apparatus after an outer bag has fully inflated.
Figure 13:
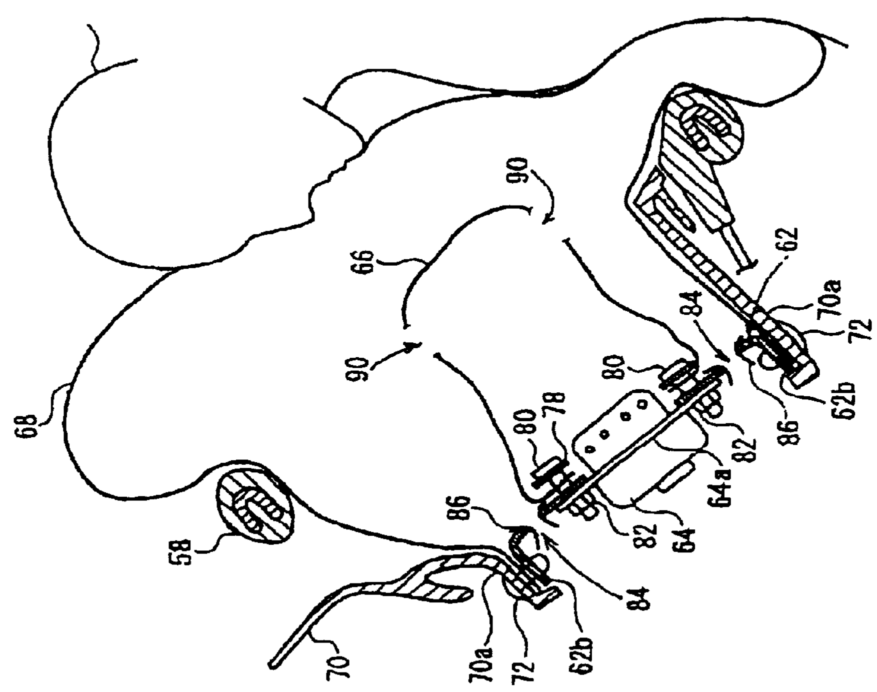
FIG. 13 is a sectional view of the airbag apparatus after an occupant has hit against the outer bag.

9 is an exploded perspective view of a retainer and a breakable sheet of the airbag apparatus; FIG. 10 is an enlarged sectional view of the vicinity of a vent hole of the airbag apparatus; FIG. 11 is a sectional view of the airbag apparatus immediately after a module cover has started to open; FIG. 12 is a sectional view of the airbag apparatus after an outer bag has fully inflated; and FIG. 13 is a sectional view of the airbag apparatus after an occupant has hit against it.

An airbag apparatus 60 is a driver-seat airbag apparatus arranged inside a steering wheel 58.

The airbag apparatus 60 includes a retainer 62, an inflator 64 mounted to the retainer 62, an inner bag 66, an outer bag 68, and a module cover 70 for covering the folded airbag (the inner bag 66 and the outer bag 68).

The retainer 62 includes a main surface 62*a* (see FIG. 9) to which the inner bag 66 is mounted and upstanding pieces 62*b* standing rearward (opposite to the occupant) from the rim of the main surface 62*a*. The module cover 70 has legs 70*a* on the side, which are fastened to the upstanding pieces 62*b* of the retainer 62 with rivets 72. As shown in FIG. 10, the rim of the outer bag 68 is sandwiched between the legs 70*a* and the upstanding pieces 62*b*. The rivets 72 also pass through the rim of the outer bag 68.

The inflator 64 is secured to the retainer 62 such that the upper end thereof comes in the inner bag 66 through an inflator-mounting opening 76 in the main surface 62*a*. Reference numeral 78 denotes an airbag mounting member called a ferrule. The opening rim of the inner bag 66 is sandwiched between the ferrule 78 and the opening 76 of the main surface 62*a*, and thus the inner bag 66 is secured to the retainer 62. Bolts 80 are fixed to the ferrule 78. The bolts 80 are inserted in bolt insertion holes of the opening rim of the inner bag 66, the main surface 62*a* of the retainer 62 and a flange 64*a* of the inflator 64 and nuts 82 are tightened to the bolts 80.

The module cover 70 has a tear line 70*b* for tearing open the module cover 70 on the back.

Figure 9:
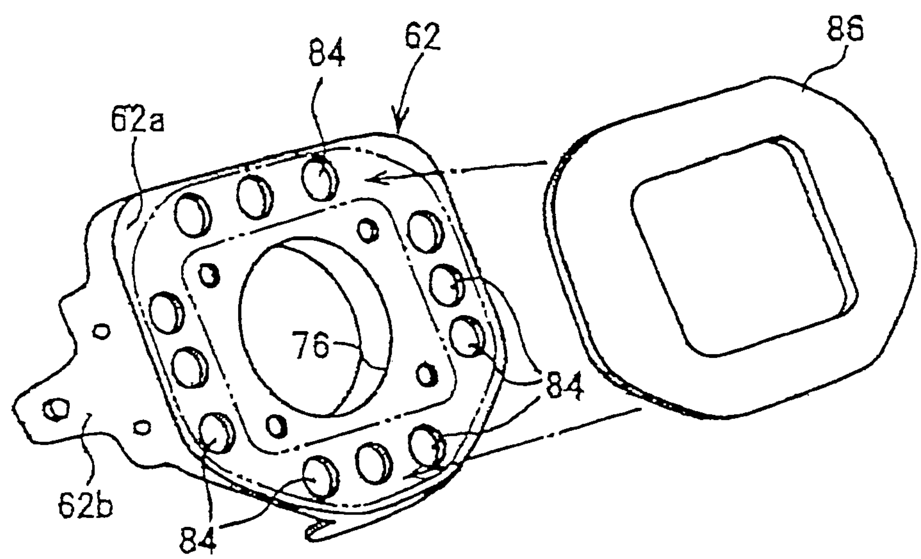
FIG. 9 is an exploded perspective view of a retainer and a breakable sheet.

As shown in FIGS. 9 and 10, the main surface 62*a* of the retainer 62 has a plurality of vent holes 84 along the outer periphery thereof. A breakable sheet (hereinafter, simply referred to as a sheet) 86 is superposed on the main surface 62*a* to close the vent holes 84. The sheet 86 is made of flexible resin, woven fabric, and the like but is not limited to that. In the exemplary embodiment shown in FIGS. 8–13, the sheet 86 is bonded to the main surface 62*a* with a bonding or adhesive agent; however, the way of fixing the sheet 86 is not limited to that.

The inner bag 66 is arranged inside the outer bag 68, as shown in the drawing. The capacity of the inner bag 66 is from about 1.5 times as high as that of the space surrounded by the module cover 70 and the main surface 62*a* of the retainer 62 to about half of that of the outer bag 68. The outer bag 68 has a capacity substantially equal to that of a general driver-seat airbag.

The end of the inner bag 66 has gas-through openings 90 for communicating the inside of the inner bag 66 with the inside of the outer bag 68.

The operation of the driver-seat airbag apparatus 60 with such an arrangement will now be described.

When the inflator 64 is activated to emit gas in a car crash, the gas from the inflator 64 is let in the inner bag 66 to inflate the inner bag 66 first. Referring to FIG. 11, since the inner capacity of the inner bag 66 is higher than that of the space surrounded by the module cover 70 and the main surface 62*a* of the retainer 62, the module cover 20 is torn open along the tear line 70*b* by the inflation pressure of the inner bag 66 when the inner bag 66 has inflated. The inner bag 66 pushes open the module cover 70 to inflate into the interior of the vehicle.

Only a small amount of gas flows out from the inner bag 66 into the outer bag 68 through the gas-through openings 90 at the end of the inner bag 66 until the inner bag 66 starts to inflate into the interior of the vehicle, so that the outer bag 68 is pushed out in a generally un-inflated condition by the inner bag 66 into the interior of the vehicle.

When the inner bag 66 has sufficiently inflated, the gas in the inner bag 66 is discharged into the outer bag 68 through the gas-through openings 90, and the outer bag 68 inflates sufficiently wide, as shown in FIG. 12.

Referring to FIG. 13, when the occupant has hit against the outer bag 68, and so the inner pressure of the outer bag 68 has increased to exceed the predetermined level, the breakable sheet 86 is broken by the pressure applied from the inside of the outer bag 68 to open the vent holes 84. Accordingly, the gas in the outer bag 68 is discharged through the vent holes 84 to absorb the impact of the occupant sufficiently.

Also in the airbag apparatus 60, even when the inner pressure of the inner bag 66 has become high before the module cover 70 is pushed open, the gas does not flow out through the vent holes 84, which allows the airbag to inflate early and the low-capacity inflator to be provided. Of course, when the occupant has hit against the airbag apparatus 60 to increase the inner pressure of the outer bag 68 to a predetermined level, the vent holes 84 are opened without failure.

The airbag apparatus according to the invention can be applied not only to occupant protection airbags but also to pedestrian protection airbag apparatuses, e.g., and that deploy outward of the vehicle.

As described above, the invention provides an airbag apparatus capable of keeping the vent hole closed until the inner pressure of the outer bag has increased to a predetermined level by the crash of the occupant, thereby inflating an airbag early or providing a low-capacity gas generating means. When the occupant has hit against the outer bag to increase the inner pressure of the outer bag to the predetermined level, the vent hole is opened without failure to absorb the impact of the occupant.

The priority application, Japanese Patent Application No. 2002-312955 filed on Oct. 28, 2002, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. For example, any and all embodiments of the lid 24 and the sheet 86 are intended to be included in the scope of the present invention. The scope of the present invention is to be defined as set forth in the following claims.

What is claimed is:

1. An airbag apparatus comprising:

an airbag having an inner bag and an outer bag, the outer bag including a vent hole;

a gas generator configured to supply gas to the inner bag, wherein the inner bag includes an opening to allow gas to exit the inner bag to inflate the outer bag;

a retainer configured to hold the gas generator; and a closing mechanism separate from the airbag for maintaining the vent hole closed until the pressure of the gas in the outer bag reaches a predetermined level, the mechanism including a lid and a holding member configured to hold the lid, wherein the lid is positioned between the holding member and the retainer inside the outer bag, and wherein the vent hole is positioned so that gas escapes from the vent hole out of the outer bag and through the retainer.

2. The apparatus of claim 1, further comprising a cover connected to the retainer for covering the airbag in a folded condition, wherein the cover is pushed open by the inflation of the inner bag.

3. The apparatus of claim 1, wherein the lid includes a frangible portion that breaks when the pressure in the outer bag reaches a predetermined level to allow gas to escape out of the outer bag.

4. The apparatus of claim 1, wherein the closing mechanism includes a gasket between the lid and the retainer.

5. The apparatus of claim 1, wherein the retainer includes a side wall attached to a bottom wall, and the closing mechanism is mounted to a portion of the side wall.

6. The apparatus of claim 1, further comprising a second holding member configured to hold the inner bag and the outer bag.

* * * * *